US011805175B2

(12) United States Patent
Perumalla et al.

(10) Patent No.: US 11,805,175 B2
(45) Date of Patent: Oct. 31, 2023

(54) MANAGEMENT OF DEVICES IN A SMART ENVIRONMENT

(71) Applicant: International Business Machines Corporation, Armonk, NY (US)

(72) Inventors: Saraswathi Sailaja Perumalla, Visakhapatnam (IN); Sarbajit K. Rakshit, Kolkata (IN); Praveen Kumar M Kuntumalla, Malvern, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/539,463

(22) Filed: Dec. 1, 2021

(65) Prior Publication Data

US 2023/0171318 A1   Jun. 1, 2023

(51) Int. Cl.
*H04L 67/125*   (2022.01)
*H04L 67/104*   (2022.01)
*G16Y 40/10*   (2020.01)
*G16Y 40/30*   (2020.01)

(52) U.S. Cl.
CPC ............ *H04L 67/125* (2013.01); *G16Y 40/10* (2020.01); *G16Y 40/30* (2020.01); *H04L 67/1048* (2013.01)

(58) Field of Classification Search
None
See application file for complete search history.

(56) References Cited

U.S. PATENT DOCUMENTS

| 11,122,424 | B1* | 9/2021 | Branscomb | H04W 12/64 |
|---|---|---|---|---|
| 2018/0025649 | A1* | 1/2018 | Contreras | G08G 5/0069 |
| | | | | 701/3 |
| 2018/0070824 | A1* | 3/2018 | Cronin | A61B 5/02055 |
| 2020/0349831 | A1* | 11/2020 | Baek | G08B 21/0272 |
| 2021/0256789 | A1* | 8/2021 | Pasirstein | G06F 21/554 |

FOREIGN PATENT DOCUMENTS

| DE | 102017106321 A1 | 10/2017 |
|---|---|---|
| WO | 2021082565 A1 | 5/2021 |

OTHER PUBLICATIONS

Grigoropoulous, et al., "Flexible Deployment and Enforcement of Flight and Privacy Restrictions for Drone Applications." In 2020 50th Annual IEEE/IFIP International Conference on Dependable Systems and Networks Workshops (DSN-W). 8 pages. DOI 10.1109/DSN-W50199.2020.00029.

(Continued)

*Primary Examiner* — Kevin T Bates
*Assistant Examiner* — Emad Siddiqi
(74) *Attorney, Agent, or Firm* — Haley J. McClory

(57) ABSTRACT

A processor may analyze an external device for one or more activity data collection devices. A processor may identify an activity the external device will perform in a protected boundary using the one or more activity data collection devices. A processor may deactivate the one or more activity data collection devices associated with the external device. A processor may generate activity data based, at least in part, on the activity and the protected boundary. A processor may output the activity data to the external device. In some embodiments, the external device may perform the activity using the activity data.

16 Claims, 5 Drawing Sheets

(56) References Cited

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

Nene, Vidi. "Smart Contracts for Drones Using Blockchain." Published Aug. 23, 2019 by Drone Below. 30 pages. https://dronebelow.com/2018/10/19/smart-contract-for-drones-using-blockchain/.

Sprute, et al., "Interactive Restriction of a Mobile Robot's Workspace in a Smart Home Environment." Published Oct. 28, 2019 by ARXIV. 20 pages. http://dx.doi.org/10.3233/AIS-190539.

* cited by examiner

MANAGEMENT OF DEVICES IN A SMART ENVIRONMENT

BACKGROUND

The present disclosure relates generally to the field of artificial intelligence, and more particularly to the field of smart devices.

Computing devices or other smart devices have evolved over time to accomplish various tasks for humans, making our lives easier. Such devices can be found in people's homes and offices to assist people with some aspect of their day. As these devices have grown in popularity, so too have their usefulness and their ability to enhance users' daily experience.

SUMMARY

Embodiments of the present disclosure include a method, computer program product, and system for managing an one or more personal devices in a smart environment.

A processor may analyze an external device for one or more activity data collection devices. A processor may identify an activity the external device will perform in a protected boundary using the one or more activity data collection devices. A processor may deactivate the one or more activity data collection devices associated with the external device. A processor may generate activity data based, at least in part, on the activity and the protected boundary. A processor may output the activity data to the external device. In some embodiments, the external device may perform the activity using the activity data.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
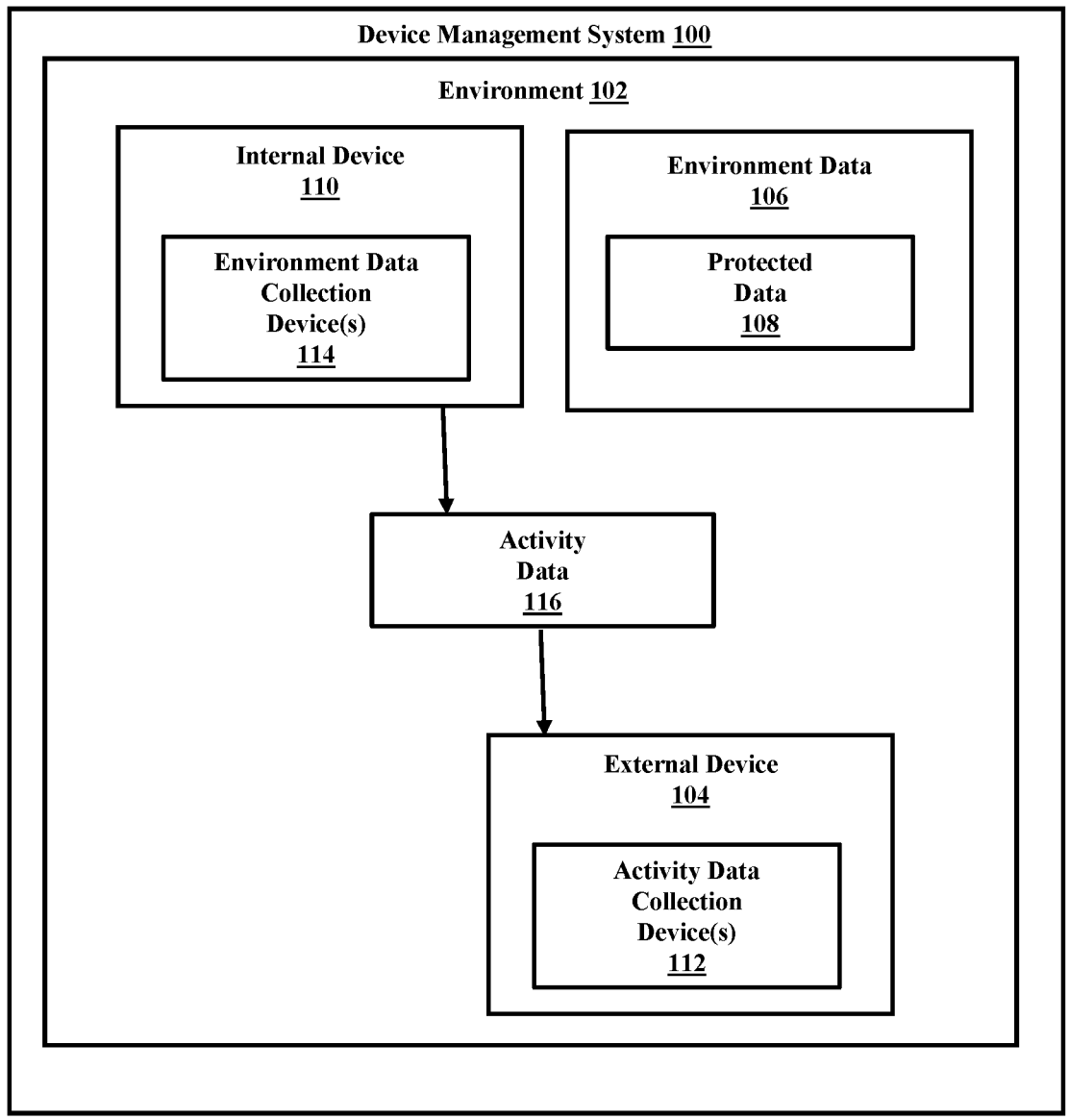
FIG. 1 depicts a block diagram of an embodiment of a device management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of artificial intelligence (AI), and more particularly to smart devices, such as robots. While the present disclosure is not necessarily limited to such applications, various aspects of the disclosure may be appreciated through a discussion of several examples using this context.

The demand for smart devices, has risen significantly over the years as the usefulness of such devices has expanded into both a person's home and work-life. Often such devices connect to one or more other devices or networks, allowing the devices to interact with each other and provide more utility for a user. For example, a user of a robotic smart device may issue voice commands to direct a robot to perform various household tasks, such as vacuuming or mopping a floor. The usefulness of such smart devices is compounded when combined with AI techniques. Such AI enabled personal smart devices can be configured into independently perform various activities, such as those traditionally performed by human. Such smart devices are often configured to collect information from the surrounding environment (e.g., smart environment). Often, the more data received/collected over time by these devices, the more accurately the smart device can perform a particular task.

Due the complex learning capabilities associated with smart devices, it is possible to make accidental disclosures of protected data or information (e.g., private, sensitive, privileged, and/or confidential information) when such smart devices are configured within or enter an environment. For example, a robot (e.g., smart device) may be configured to vacuum the floors associated with a medical office where health care professionals treat patients. In this example, if the robot were to enter a room to vacuum, it is possible that while performing the vacuuming activity that the robot may accidently overhear and/or capture personal health care information displayed in the room (e.g., an X-Ray displayed on the wall). The personal health care information collected by the robot (e.g., smart device) is unlikely to be secure and may violate not only the employer's guidelines, but also legal regulations associated with the management of private health care or medical data. Information security concerns are particularly important when smart devices are owned or maintained by a third party, because any control over the information may be lost. As such, there is a desire to ensure particular types of information (e.g., private, sensitive, privileged, and/or confidential information) are properly managed in an environment having one or more smart devices (e.g., robots).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

Also, any device depicted in the drawings can be a different device. For example, if a mobile device is shown sending information, a wired device could also be used to send the information. The term "module" may refer to a hardware module, software module, or a module may be a combination of hardware and software resources. Embodiments of hardware-based modules may include self-contained components such as chipsets, specialized circuitry, one or more memory devices and/or persistent storage. A software-based module may be part of a program, program code or linked to program code containing specifically programmed instructions loaded into a memory device or persistent storage device of one or more data processing systems operating as part of the computing environment (e.g., intelligent ecosystem 100).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

In embodiments discussed herein, solutions are provided in the form of a method, system, and computer program product, for managing smart devices in an environment. Embodiments contemplated herein may prevent an external device from collecting information associated with the environment while the external device (e.g., third party smart device) performs an activity in an environment. In these embodiments, a processor may detect an external device intending to perform an activity in an environment and analyze the external device for one or more activity data collection devices. The detected activity data collection device(s) may be deactivated, preventing the external device form collecting environment data. A processor may generate activity data that includes only the information/data that would be necessary to perform the activity in the environment. The activity data may be output to the external device. By providing the external device with activity data, the external device can perform the intended activity without having access to environment data that may include protected data. Such embodiments may be used in various industries that use smart devices (e.g., external or third party smart devices) in environments where private, sensitive, privileged, and/or confidential information is present.

An environment may include any area, room, conference hall, home, and/or building that may include some form of protected data. An environment may include one or more internal devices. The one or more internal devices may be any type of device that may be configured to receive/collect information or data from a smart environment. Such internal devices may include, but are not limited to, voice assistant devices (e.g., Google Home®, Amazon Alexa®, Siri®, Bixby®, etc.), Internet of Things (IoT) device(s), any type of robot, or any other available smart device. In some embodiments, an internal device may be configured to collect/receive information associated with the environment (e.g., environment data) using one or more environment data collection devices (e.g., IoT devices). While in some embodiments, the one or more environment data collection devices are configured within the internal device, in other embodiments, the one or more environment data collection devices may be configured within the environment but independent of the internal device.

An environment may include any area, room, conference hall, home, and/or building that may include some form of protected data. An environment may include one or more internal devices. The one or more internal devices may be any type or combination of devices that may be configured to receive/collect information/data, or environment data, from the environment. Environment data may refer to any information/data associated with environment of interest. For example, environment data may include, but is not limited to, information/data associated with environment characteristics (e.g., environment dimensions, equipment or objects and their location in the environment, etc.), actions taking place in the environment (e.g., work currently performed in the environment, people's movements throughout the room, conversations, etc.), and any other information that may be passively collected (e.g., when people utilize/do not utilize the environment).

In embodiments, the internal device may have permissioned access to collect and analyze the environment data and any potential protected data that may be found in the environment (e.g., as determined by a security policy). For example, internal devices may include, but are not limited to, assistant devices (e.g., Google Home®, Amazon Alexa®, Siri®, Bixby®, etc.), Internet of Things (IoT) device(s), any type of robot, or any other available smart device. In embodiments, environment data may include a subset of data referred to herein as protected data. Protected data may refer to data associated with the environment data that includes information/data that may be private, sensitive, privileged, confidential, or information otherwise determined should be protected (e.g., data unrelated to performing an activity). In some embodiments, protected data may be considered a subset of environment data. In some embodiments, a processor may be able to use AI and machine learning techniques to identify what environment data is protected data, while in other embodiments, a processor may receive user input regarding what information should be protected information and/or how to classify environment data as protected data.

In some embodiments, an internal device may be configured to collect/receive environment data associated with the environment using one or more environment data collection devices. Environment data collection devices may include, but are not limited to, cameras, sensors (e.g., thermal scanners, infrared imaging, etc.), IoT feeds, other smart devices, etc.). While in some embodiments, the one or more environment data collection devices are configured within the internal device, in other embodiments, the internal device refers to one or more environment data collection devices configured independently within the environment. In one example embodiment, an internal device may be a robot having one or more environment data collection devices and configured to freely collect/receive environment data throughout the environment Though many embodiments contemplated herein may reference the internal device as a robot and/or a single device, such embodiments are meant as examples only and should not be considered as limiting features. The internal device may be configured as any smart device contemplated herein and may combine any number or network of smart devices.

In some embodiments, a processor may store environment data collected over time in a historical repository that may be used to perform additional analysis (e.g., using AI and machine learning techniques). In some embodiments, environment data may also include the results or data associated with any simulation or analysis, such as those contemplated herein. In some embodiments, a processor may have access to a security policy. The security policy may include rules and/or policies associated with determining what environment data may be protected data, how the protected data should be protected, how a processor may identify protected data associated with the environment, and what external devices may be allowed into the environment.

In embodiments, a processor may detect (e.g., using data collection devices or smart devices) an external device may intend to enter the environment. An external device may refer to any smart device (e.g., robot, AI assistant, etc.) that is authorized (e.g., via a security policy) to perform activities within the environment, but is not authorized to have access to protected information. While in many embodiments contemplated herein the external device may be maintained or owned by a third party the processor determines should not have access to the protected data, in other embodiments, the external device may be maintained by those occupying the environment (e.g., users or administrators) who do not want protected data replicated or captured without unauthorized, even accidently. For example, a business office may use a business owned robotic vacuum to vacuum various offices in a building, but may classify the robotic vacuum as an external device to prevent the robotic vacuum from collecting possible protected data, such as floor plan data or times when the office is unoccupied. Alternatively, an external device may be a delivery robot used by a third party company that can be used to make deliveries to different offices at various office building locations and may have access to various protected data as a consequence of collecting environment data that the delivery robot may require to direct and orient itself to the correct office upon entering the office building.

In some embodiments, a processor may detect the external device has entered an entrance area, such as an entry gate, that is separated from the environment. In embodiments, once detected, a processor may analyze the external device to identify the activity or activities the external device is intended to perform in the environment. An activity may include any task (e.g., physical activities) or service the external device may be programed to perform. For example, an activity may include, but is not limited to, delivering products to customers, cleaning floors, or assembling components. During analysis, a processor may also analyze the external device for one or more activity data collection devices. An activity data collection device may be a device or sensor (e.g., thermal camera, infrared camera, IoT sensors, etc.) that may be used by the external device to collect environment data that the external device may use to perform the activity (e.g., navigational systems). An activity may include any action or service that may be performed by an external device within the environment.

In embodiments, a processor may deactivate the one or more activity data collection devices associated with the external device. By deactivating the one or more activity data collection devices, the processor prevents the external device from collecting environment data or possible protected data from the environment. A processor may deactivate the one or more activity data collection devices in a variety of deactivation techniques. These deactivation techniques include, but are not limited to, decoupling the one or more activity data collection devices from the external device (e.g., decoupling using magnetic or mechanical means), issuing a notice to a user directing the user to deactivate the one or more activity data collection devices (e.g., user removes or covers the activity data collection devices), programmably deactivate one or more activity data collection devices, or any combination thereof.

In embodiments where the external device is a robot, a processor may analyze the external device for one or more activity data collection devices at an entry gate. In such embodiments, the processor may identify how the activity data collection devices may be deactivated. For example, in some embodiments, a processor may determine the one or more activity data collection devices may be decoupled from the external device either mechanically (e.g., activity data device is clipped on the external device) or magnetically (e.g., with an electromagnetic coupling). While in some embodiments, a processor may direct or instruct the external device to decouple the one or more activity data collection devices, in other embodiments, a processor may issue a notification to another smart device or may instruct a user to decouple or remove the activity data collection devices. Removed or decoupled activity data collection devices may be temporarily stored in a secure area, such as the entry gate, while the external device is performing the activity. In some embodiments, a processor may determine that the one or more activity data collection devices cannot be decoupled from the external device. In these embodiments, a processor may either programmicaly deactivate the activity data collection devices, cover the activity data collection device, or otherwise prevent the active data collection devices from collecting environment data.

In embodiments, a processor may use an internal device to collect environment data associated with the environment. The processor may analyze the environment data and determine, using the security policy, what environment data may be considered protected data. In embodiments, a processor may identify what activity the external device may be intended to perform. After the activity is identified, a processor may generate activity data. In embodiments, the processor may base the generation of activity data, at least in part, on the activity and the environment. For example, a processor may use AI and machine learning capabilities to analyze historical environment data collected from the environment over time to generate activity data. In embodiments, activity data may be considered the necessary information/data that would be required by an external device to perform the activity in the environment.

In embodiments, a processor may then direct or output the activity data to the external device. In some embodiments, the activity data may include a call/trigger for the external device to perform the activity. In embodiments, the external device may then use the activity data to perform the activity in the environment. While in some embodiments, the activity data may be provided to the external device in one data transference, in other embodiments, a processor may direct the internal device to continuously feed updated activity data to the external device as the external device may need to properly perform the activity/service. For example, an internal device may have to update the activity data if there were any changes to the environment data, such as a change in position of an obstacle (e.g., a person in the environment moves a cart to a new location).

In embodiments, a processor may direct the internal device to continuously collect environment data while the external device is performing the activity. Using this environment data, a processor determine or identify that the external device has completed the activity. Once the activity has been completed, a processor may direct the external device form the environment. In some embodiments, a processor may direct (e.g., using environment data from the internal device) to the entry gate area or out of the environment. Once the external device is removed from the environment, the processor may reactivate the external device's one or more activity data collection devices. How a processor reactivates the external devices may depend on how the activity data collection device was deactivated. For example, if the activity data collection device was decoupled (e.g., magnetically or mechanically) from the external device or covered, a processor may instruct that the activity data collection device be reattached or uncovered. Alternatively, if the activity data collection device was programmably deactivated, a processor may deactivate that measure to ensure the activity data collection device is reactivated.

In some embodiments, a processor may use a distributed ledger or blockchain to record and track data associated with the activity. In these embodiments, an external device (e.g., a robot) or internal device may use tracking rules (e.g., smart contract rules) to track how the internal and/or external devices may perform various activities, such as the movement associated with the various activities. This data may be used to support the robot.

Turning now to the Figures, FIG. 1 depicts device management system 100, in accordance with embodiments of the present disclosure. In embodiments, device management system 100 leverages the use of AI and machine learning to prevent external devices from accessing protected in an environment while the external device is performing an activity. FIG. 1 provides an illustration of only one embodiment and does not imply any limitations with regard to the environments in which different embodiments may be implemented. Many modifications to the depicted environment may be made by those skilled in the art without departing from the scope of the invention as recited by the claims.

In embodiments, device management system 100 may include environment 102 and external device 104. Environment 102 may include any environment having data or information that a user may want to protect (e.g., protected data 108), such as an office or medical center. In embodiments, environment 102 may include data, such as environment data 106. Environment data 106 may include data as it generally relates to environment 102 and protected data 108. Protected data 108 may include, but is not limited to, private, sensitive, privileged, and/or confidential information that may be associated or located in environment 102. In some embodiments, protected data 108 may be a subset of environment data 106. In embodiments, device management system 100 may be configured to prevent external device 104 from collecting protect data found in the environment. External device 104 may be configured to perform an activates (e.g., services, such as delivery or cleaning) within environment 102.

In embodiments, device management system 100 may be configured to analyze external device 104 for one or more activity data collection devices 112. External device 104 may use one or more activity data collection devices 112 to collect environment data 106 to perform the activity.

In embodiments, device management system 100 may be configured to identify an activity the external device may be configured to perform in environment 102 using the one or more activity data collection device(s) 112. In embodiments, device management system 100 may identify the activity data collection devices 112 using internal device 110 via one or more environment data collection device(s) 114. Once identified, device management system 100 may deactivate one or more activity data collection devices 112 associated with external device 104. In embodiments, device management system 100 may generate activity data. Activity data 116 may include the subset of environment data 106 that external device 104 may need to perform the activity without any environment data 106 that may be considered protected data 108. In embodiments, device management system 100 may generate activity data based, at least in part on, the activity and the environment. More particularly, device management system 100 may generate activity data using internal device 110 and environment data collection devices 114 to collect environment data 106 and, using AI and machine learning techniques, may remove any protected data 108 while also ensuring external device 104 has sufficient data to perform the activity. In embodiments, device management system 100 may be configured to send or output the activity data to the external device 104. With activity data 108, external device 104 may perform the activity. In embodiments, once the activity has been completed, device management system 100 may direct (e.g., using environment data 106 from internal device 110) to exit environment 102. Once external device 104 has left environment 102, device management system 100 may be configured to reactivate the activity data collection devices 112 for the external device 104 to ensure external device 104 can perform any necessary objectives outside environment 102.

Figure 2:
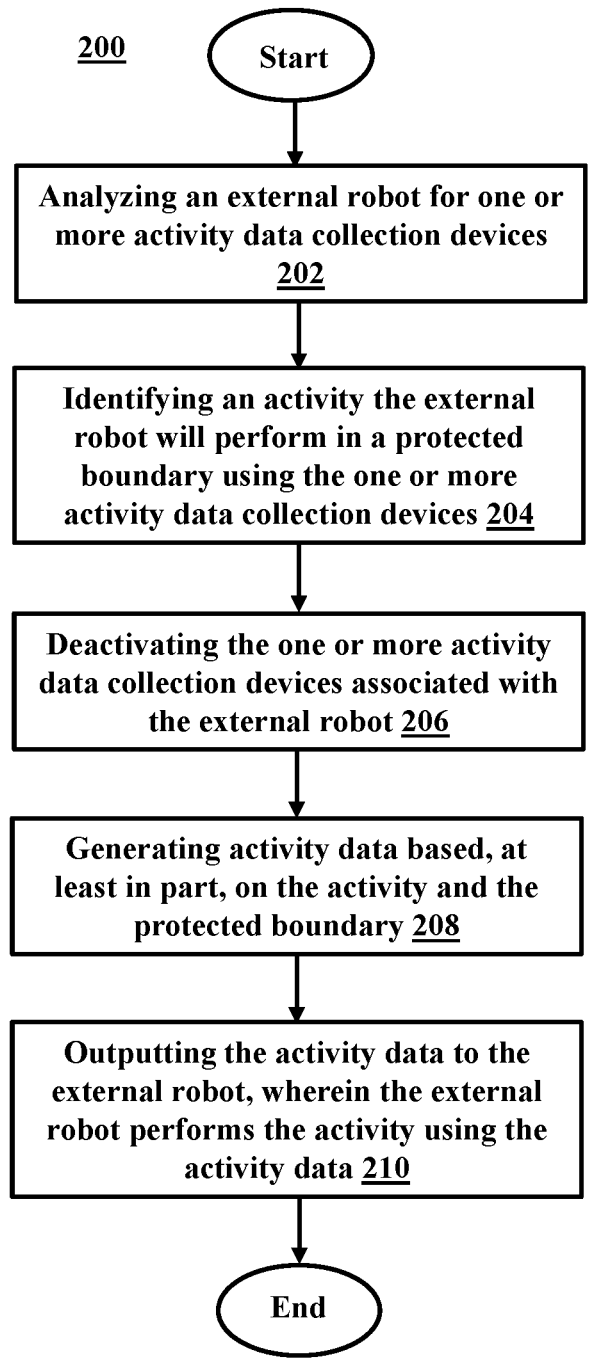
FIG. 2 illustrates a flowchart of a method for managing a protected boundary, in accordance with embodiments of the present disclosure.

Referring now to FIG. 2, a flowchart illustrating an example method 200 for managing devices in a smart environment, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202. At operation 202 a processor may analyze an external device for one or more activity data collection devices. The method 200 proceeds to operation 204.

At operation 204, a processor may identify an activity the external device will perform in an environment using the one or more activity data collection devices. The method 200 proceeds to operation 206.

At operation 206, a processor may deactivate the one or more activity data collection devices associated with the external device. The method 200 proceeds to operation 208.

At operation 208, a processor may generate activity data. In some embodiments, this may be based, at least in part, on the activity and the environment. The method 200 proceeds to operation 210.

At operation 210, a processor may output the activity data to the external device. In some embodiments, the external device may perform the activity using the activity data. In embodiments, the destination may be in the physical environment. In some embodiments, as depicted in FIG. 2, after operation 210, the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
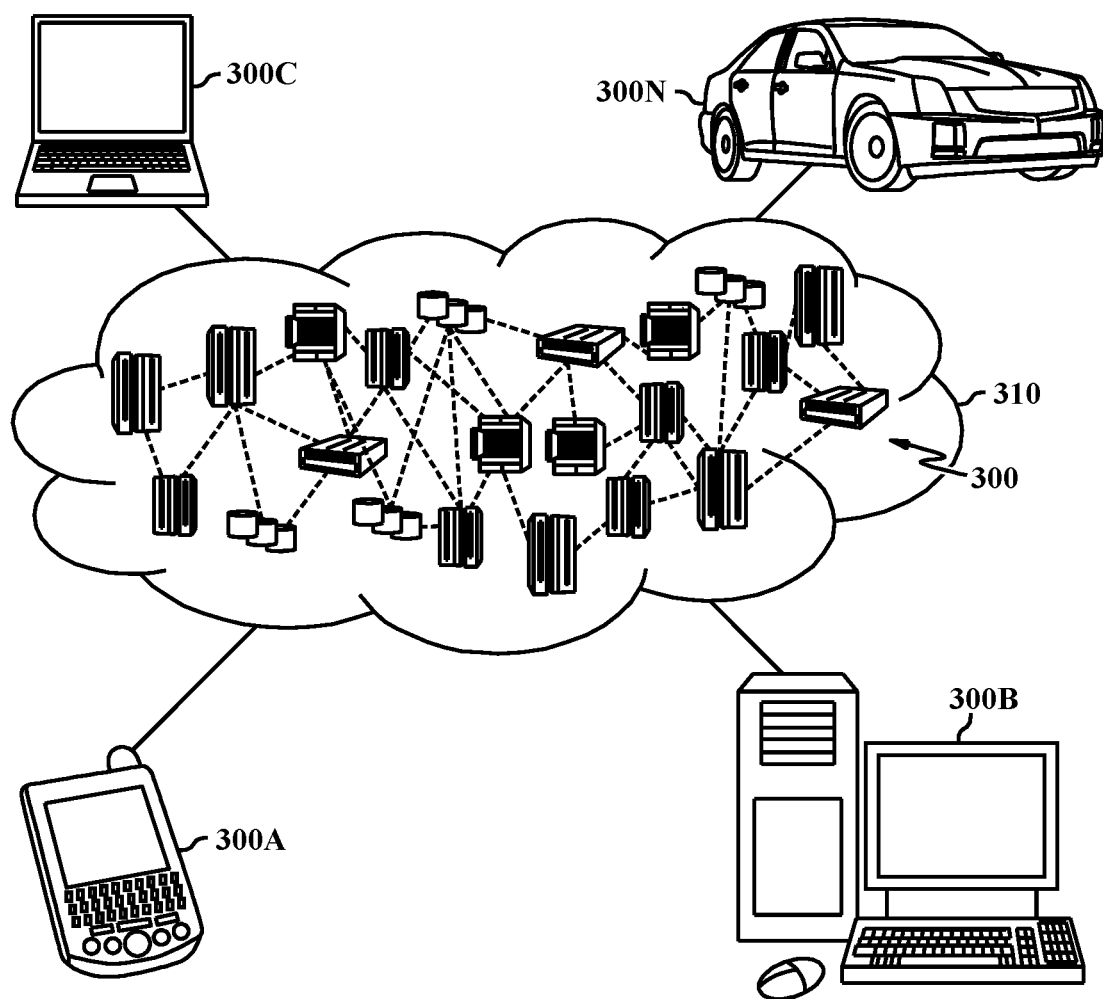
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
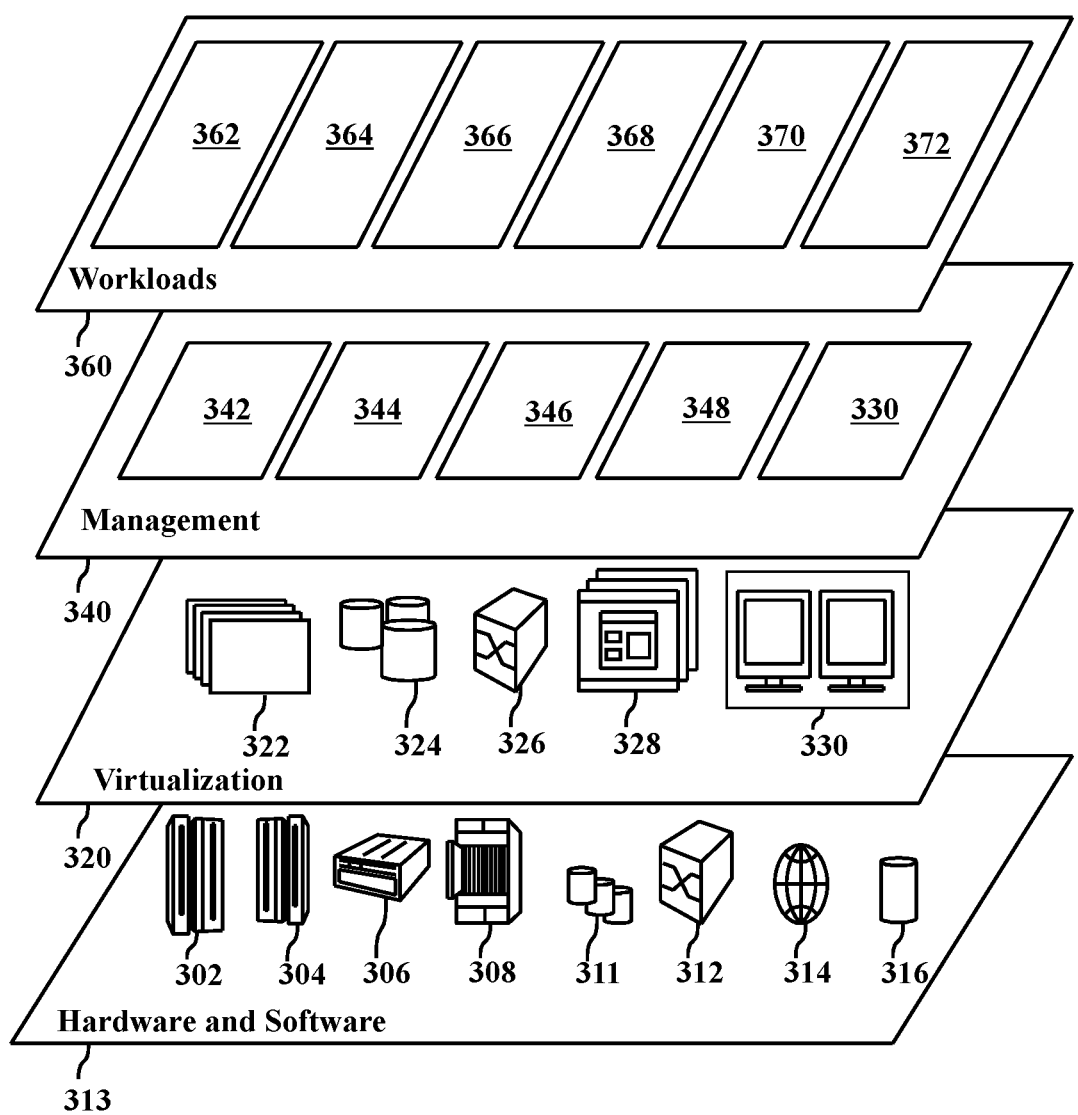
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and device managing 372.

Figure 4:
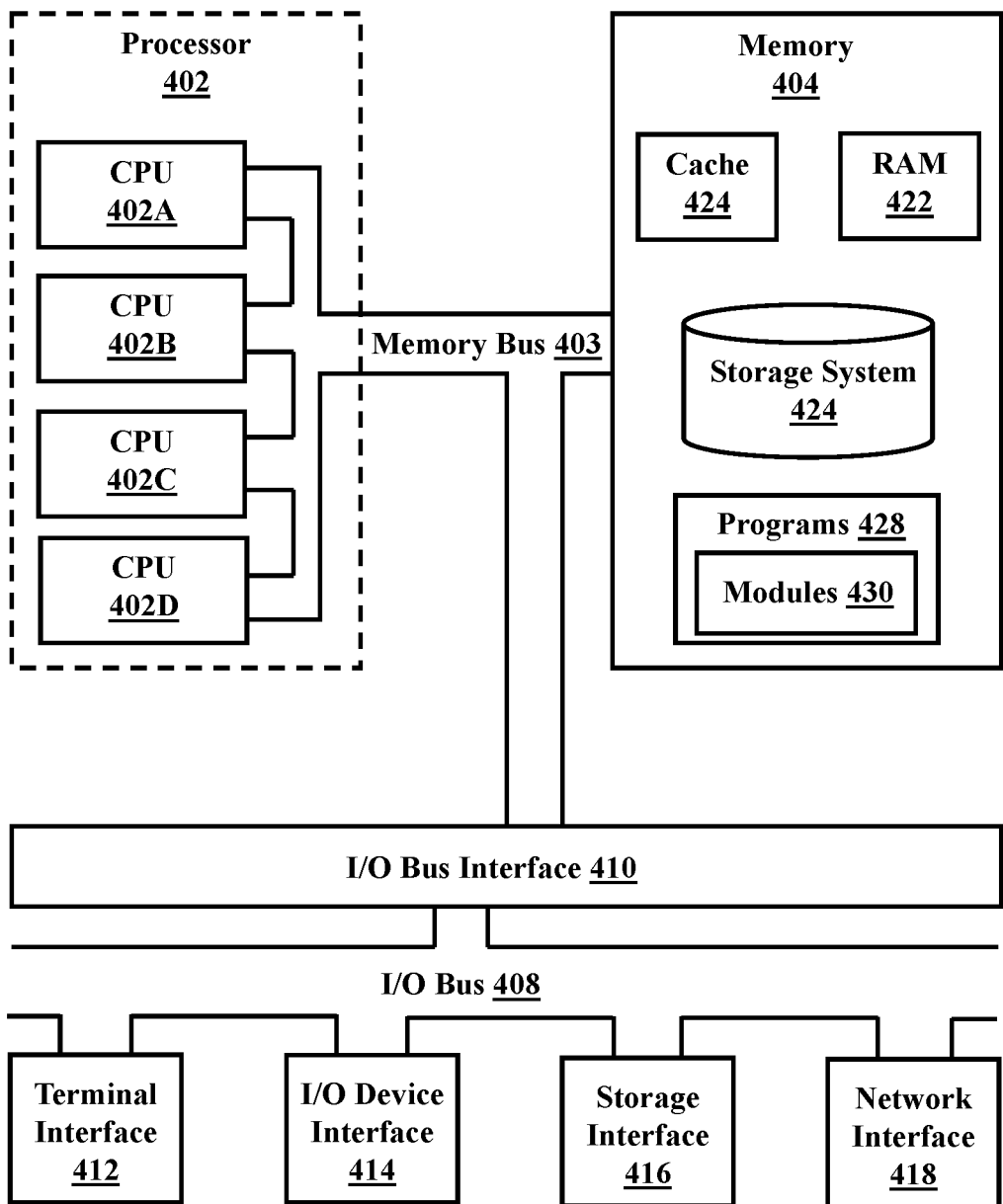
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for intercomponent communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer implemented method for managing one or more smart devices in an environment, the method comprising:
   detecting, by a processor, the one or more smart devices associated with a protected boundary, wherein detecting the one or more smart devices is based on a security policy;
   identifying an external device from the one or more smart devices, based on the security policy, wherein the external device is not authorized to collect protected boundary data associated with the protected boundary;
   analyzing the external device for one or more activity data collection devices;
   identifying an activity the external device will perform in the protected boundary using the one or more activity data collection devices;
   deactivating the one or more activity data collection devices associated with the external device;
   uncoupling the one or more activity data collection devices from the external device by issuing a notice to a user, wherein the notice directs a user to mechanically remove the one or more activity data collection device from the external device;
   generating activity data based, at least in part, on the activity and the protected boundary; and
   continuously feeding the activity data to the external device as the external device performs the activity.

2. The computer implemented method of claim 1, further comprising:
   identifying the external device has completed the activity;
   directing the external device from the protected boundary; and
   reactivating the one or more activity data collection devices.

3. The computer implemented method of claim 1, wherein generating the activity data includes:
   receiving the protected boundary data from one or more boundary data collection devices;
   analyzing the protected boundary data and the activity; and
   identifying the activity data from the protected boundary data, wherein the activity data is a subset of the protected boundary data.

4. The computer implemented method of claim 1, deactivating the one or more activity data collection devices includes:
   preventing the external device from collecting protected boundary data.

5. The computer implemented method of claim 1, further comprising:
   identifying an internal device from the one or more smart devices, wherein the internal device is authorized to collect the protected boundary data; and
   activating the internal device, wherein the internal device collects the activity data from the protected boundary.

6. The computer implemented method of claim 1, wherein deactivating the one or more activity data collection devices includes:
   instructing a smart device of the one or more smart devices to remove the one or more activity data collection devices from the external device;
   identifying the external device has completed the activity; and
   reattaching the one or more activity data collection devices to the external device.

7. A system method for managing one or more smart devices in an environment, the system comprising:
   a memory; and
   a processor in communication with the memory, the processor being configured to perform operations comprising:
   detecting the one or more smart devices associated with a protected boundary, wherein detecting the one or more smart devices is based on a security policy;
   identifying an external device from the one or more smart devices, based on the security policy, wherein the external device is not authorized to collect protected boundary data associated with the protected boundary;
   analyzing the external device for one or more activity data collection devices;
   identifying an activity the external device will perform in [the protected boundary using the one or more activity data collection devices;
   deactivating the one or more activity data collection devices associated with the external device;
   uncoupling the one or more activity data collection devices from the external device by issuing a notice to a user, wherein the notice directs a user to mechanically remove the one or more activity data collection device from the external device;
   generating activity data based, at least in part, on the activity and the protected boundary; and
   continuously feeding the activity data to the external device as the external device performs the activity.

8. The system of claim 7, further comprising:
   identifying the external device has completed the activity;
   directing the external device from the protected boundary; and
   reactivating the one or more activity data collection devices.

9. The system of claim 7, wherein generating the activity data includes:

receiving the protected boundary data from one or more boundary data collection devices;

analyzing the protected boundary data and the activity; and identifying the activity data from the protected boundary data, wherein the activity data is a subset of the protected boundary data.

10. The system of claim 7, deactivating the one or more activity data collection devices includes:

preventing the external device from collecting protected boundary data.

11. The system of claim 7, further comprising:

identifying an internal device from the one or more smart devices, wherein the internal device is authorized to collect the protected boundary data; and activating the internal device, wherein the internal device collects the activity data from the protected boundary.

12. A computer program product for managing one or more smart devices in an environment, the computer program product comprising a computer readable storage medium having program instructions embodied therewith, the program instructions executable by a processor to cause the processors to perform a function, the function comprising:

detecting the one or more smart devices associated with a protected boundary, wherein detecting the one or more smart devices is based on a security policy;

identifying an external device from the one or more smart devices, based on the security policy, wherein the external device is not authorized to collect protected boundary data associated with the protected boundary;

analyzing the external device for one or more activity data collection devices;

identifying an activity the external device will perform in the protected boundary using the one or more activity data collection devices;

deactivating the one or more activity data collection devices associated with the external device;

uncoupling the one or more activity data collection devices from the external device by issuing a notice to a user, wherein the notice directs a user to mechanically remove the one or more activity data collection device from the external device;

generating activity data based, at least in part, on the activity and the protected boundary; and continuously feeding the activity data to the external device as the external device performs the activity.

13. The computer program product of claim 12, further comprising:

identifying the external device has completed the activity;

directing the external device from the protected boundary; and reactivating the one or more activity data collection devices.

14. The computer program product of claim 12, wherein generating the activity data includes:

receiving the protected boundary data from one or more boundary data collection devices;

analyzing the protected boundary data and the activity; and identifying the activity data from the protected boundary data, wherein the activity data is a subset of the protected boundary data.

15. The computer program product of claim 12, deactivating the one or more activity data collection devices includes:

preventing the external device from collecting protected boundary data.

16. The computer program product of claim 12, further comprising:

identifying an internal device from the one or more smart devices, wherein the internal device is authorized to collect the protected boundary data; and activating the internal device, wherein the internal device collects the activity data from the protected boundary.

* * * * *